United States Patent [19]

Shibano

[11] Patent Number: 4,829,542
[45] Date of Patent: May 9, 1989

[54] PSK MODEM SYSTEM HAVING IMPROVED DEMODULATION RELIABILITY

[75] Inventor: Yoshizo Shibano, Osaka, Japan

[73] Assignee: Sumitomo Electric Industries, Ltd., Osaka, Japan

[21] Appl. No.: 72,162

[22] Filed: Jul. 10, 1987

[30] Foreign Application Priority Data

Jul. 14, 1986 [JP] Japan .................................. 61-165014

[51] Int. Cl.$^4$ ............................................ H04L 27/18
[52] U.S. Cl. .......................................... 375/53; 375/57; 375/80; 375/86; 329/104; 332/9 R
[58] Field of Search ...................... 375/17, 20, 52, 53, 375/54, 55, 57, 67, 83, 84, 85, 86, 101; 329/104, 105, 110; 332/9 R, 10, 16, 21, 22

[56] References Cited

U.S. PATENT DOCUMENTS

4,417,219  11/1983  Brossand ............................... 375/53
4,726,038  2/1988   Ikegami et al. ....................... 375/53

*Primary Examiner*—Benedict V. Safourek
*Attorney, Agent, or Firm*—Stevens, Davis, Miller & Mosher

[57] ABSTRACT

A modem system is disclosed which has improved reliability of detection of transmitted PSK data using a simple signal delay detection scheme. A transmission signal is produced in which repetitive digital time slots each contain phase encoded "mark" or "space" data. Each time slot includes a reference phase portion at at least one of a front and rear portion of the time slot. The phase of the transmitted signal changes in the remaining portion of each time slot in accordance with applied digital data. For a "mark" data signal the phase changes from a reference phase in a first direction to predetermined phase in a first half of the remaining portion of the time slot, and then back to the reference phase before the end of the time slot. For a "space" data signal the phase changes from the reference value in a second direction opposite the first to another predetermined value in a first half of the remaining portion of the time slot, and then back to the reference phase before the end of the time slot. A simple delay detection demodulation system is used to recreate the original digital signal.

8 Claims, 8 Drawing Sheets

PSK MODEM SYSTEM HAVING IMPROVED DEMODULATION RELIABILITY

BACKGROUND OF THE INVENTION

1. Field of the Invention

This invention relates to a modem system, and more particularly to a modem system in which, on the signal transmitting side, digital data are subjected to PSK (phase shift keying) modulation, while, on the signal receiving side, a delay modulation is carried out to obtain the original digital data.

2. Brief Discussion of the Art

In one example of a conventional digital signal transmitting system, a digital signal is PSK-modulated on the signal transmitting side, while the signal is demodulated to obtain the original digital signal on the signal receiving side.

In such a PSK modulation system, digital signals "0" and "1" are transmitted on the variation in phase of the carrier wave, and the C/N deterioration is minimized. That is, the PSK modulation system has excellent signal characteristics and has accordingly been extensively employed for transmission of digital signals.

The PSK modulation system is often configured as a so-called "MSK system" or a so-called "DSK system".

Figure 10:
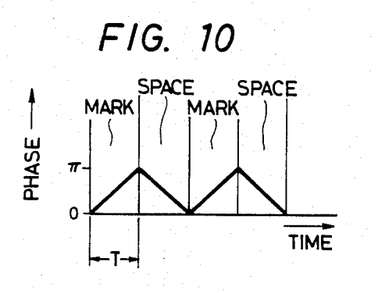
FIGS. 10 and 11 are respective signal diagrams useful in explaining the operation of conventional modulation systems.

In the MSK system, as shown in FIG. 10, when the signal is in the "mark" state, the phase is increased linearly by 180° for a time slot period of the signal; and when the signal is in "space" state, the phase is decreased linearly by 180° for a time slot period of the signal.

Figure 11:
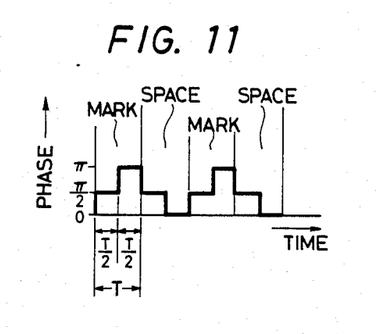

In the DSK system, as shown in FIG. 11, when the signal is in "mark" state, a time slot period of the signal is divided into two parts so that the phase is increased in two steps; and when the signal is in "space" state, a time slot period of the signal is divided into two parts so that the phase is decreased in two steps.

In the MSK system, the phase changes continuously. Therefore, the MSK system is advantageous in that the occupied frequency band-width is small. On the other hand, the DSK system is advantageous in that it is substantially not affected by multi-path fading and is therefore suitable for wide-band data transmission.

In order to demodulate a signal which is PSK-modulated, a delay detection system or a synchronous detection system are generally employed.

Figure 8A:
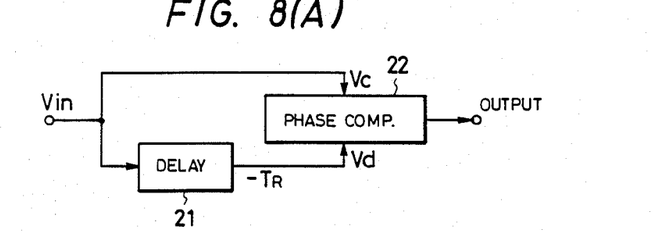
FIG. 8(A) is a block diagram of a conventional delay detector.

In the delay detection system, a signal received is divided into two parts. One of the two parts, after being delayed by one (1) or half (½) signal period of the modulation by a delay circuit, is supplied to a phase comparator, while the other is applied, as it is, to the phase comparator, so that the PSK-modulated signal is demodulated; i.e., the original digital signal is obtained. This will now be described in more detail. It is assumed that, in a delay detection device shown in FIG. 8(A), its input voltage Vin is cos $(\Omega t + \theta (t))$ where $\Omega$ is the angular frequency of the carrier, t is the time and $\theta$ (t) is the phase modulation function. The input voltage Vin is divided into two parts. One of the two parts is supplied to a terminal of a phase comparator 22, while the other is applied to another terminal of the phase comparator 22 after being delayed by a predetermined period of time TR by a delay circuit 21. The one of the two parts, namely, a signal Vc is:

$$Vc = Vin = \cos (\Omega t + \theta (t)), \text{ and}$$

the other, namely a signal Vd is:

$$Vd = \cos (\Omega(t - TR) + \theta (t - TR))$$

Figure 8B:
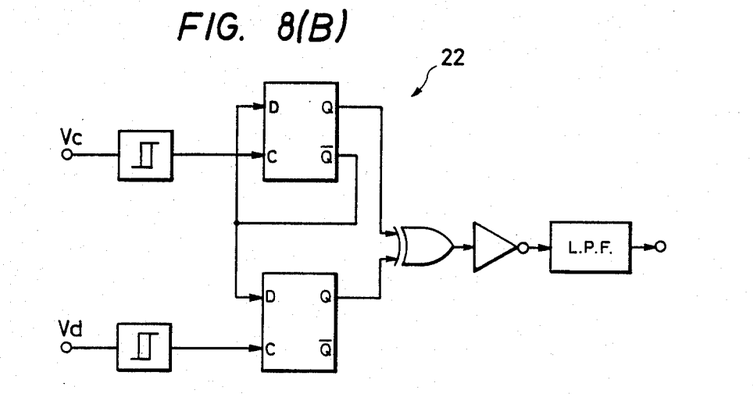
FIG. 8(B) is a circuit diagram of the phase comparator shown in FIG. 8(A)
Figure 8C:
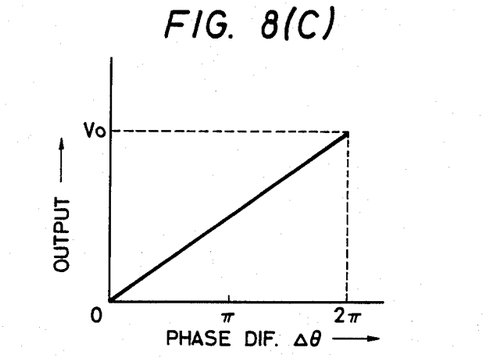
FIG. 8(C) is a signal diagram useful in explaining the operation of the FIG. 8(B) circuit.

If, in this connection, the phase comparator 22 is arranged as shown in FIG. 8(B) so that the output is proportional to the phase difference as indicated in FIG. 8(C), then the phase difference $\Delta\theta$ is:

$$\Delta\theta = \Omega TR + \theta (t) - \theta (t - TR)$$

In the above expression, it is essential that, in the MSK system or DSK system, the delay time TR is determined as follows: TR=T/2 (where T is one (1) time slot of the signal).

If $\Omega$ TR=(2n−1) $\pi$ or $\Omega = \pi/TR = (2n-1)2\pi/T$, then the reference point of the phase comparison can be set at the center of the range of operation of the phase comparator.

By way of example, the case of the DSK system will be described. However, it should be noted that the following description is applicable to the case of the MSK system in the same manner.

When $\theta (t) - \theta (t - TR) = 0$, $\Delta\theta = \Omega TR = (2n-1)\pi$. Therefore, this point is the phase reference point in the case where there is no phase shift, and an output corresponding to the point which is shifted by $\theta (t) - \theta (t - TR)$ from the reference point is obtained.

Figure 9A:
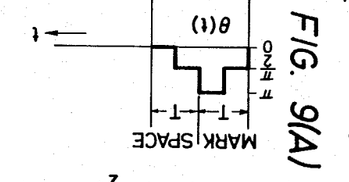
FIGS. 9(A), 9(B), 9(C), 9(D) and 9(E) are signal diagrams useful in explaining the operation of the delay detector of FIG. 8(A)
Figure 9B:
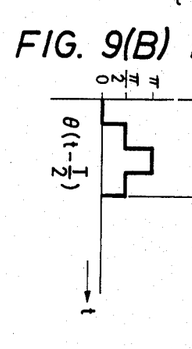

In the case of a mark-space signal, its phase function $\theta$ (t) is as shown in FIG. 9(A), and $\theta$ (t−T/2) in FIG. 9(B).

Figure 9C:
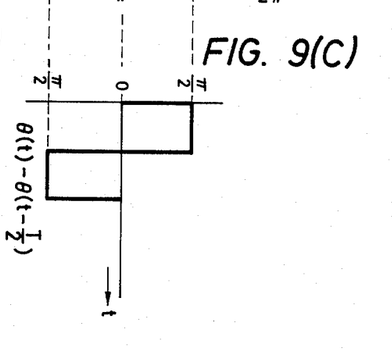
Figure 9D:
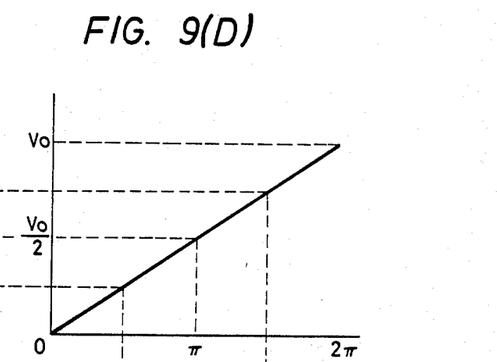
Figure 9E:
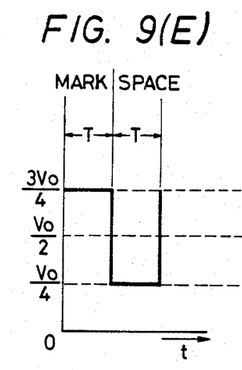

Therefore, as shown in FIG. 9(C), $\theta$ (t)−$\theta$ (t−T/2) is $\pi/2$ for a "mark" period, and $-\pi/2$ for a "space" period. Thus, an output waveform as shown in FIG. 9(E) is obtained according to an output characteristic as shown in FIG. 9(D). That is, an output obtained is 3Vo/4 for a "mark" period, and Vo/4 for a "space" period.

Accordingly, it can be determined that the signal is in a "mark" state when the output of the phase comparator 22 exceeds Vo/2, and it is in a "space" state when the output is Vo/2 or lower.

Thus far a delay detection scheme has been described. Now a synchronous detection scheme will be described. In the synchronous detection circuit, a signal received is divided into two parts, which are applied to phase comparators, respectively, and the output signal (whose frequency is equal to the carrier frequency of the signal received) of a voltage-controlled oscillator in a phase synchronization loop is supplied to one of the phase comparators while the output signal, after being phase-shifted by 90°, is applied to the other phase comparator, so that the original digital signal is obtained according to the output signals of the two phase comparators (cf. *Trans. IECE Japan*, Vol. 64-B, No. 10, 1981, GMSK Modulation System Transmission Characteristic" by Kazuaki Murota, and Kenkichi Hiraide).

As described above, in the case where the PSK-modulated signal is demodulated by the delay detection system, the signal received is divided into two parts, and only one of the two parts is delayed. Therefore, the method is advantageous in that the circuitry is simple; however, it is disadvantageous in that, in the case of a high frequency band digital signal transmission, the demodulation reliability is low. This will be described in more detail. In the delay detection system, the operating reference point is $\Delta\theta = \Omega T/2$. Therefore, when the carrier angular frequency changes by $\Delta\theta$, for instance, because of a temperature variation, then the operating reference point is also shifted as much as $\Delta\theta T/2$. If this change is great, then the "mark" and "space" cannot be determined according to whether or not the output level of the phase comparator exceeds $V_0/2$. For instance, when the carrier frequency is 1.5 GHz and the coefficient of variation with temperature of the oscillator is $10^{-5}$, then the frequency variation is 15 KHz. If, in this case, the data transmission speed is set to 32 Kbps, then $T = 1/32$ msec, and $\Delta\theta T/2 = 0.469\pi$; that is, the shift of the operating reference point is substantially $\pi/2$. In practice, the operating reference point is also affected by noise and interference waves by multipath in addition to temperature variation, and is thus even further shifted. Therefore, it is often difficult to determine, by comparing the output level of the phase comparator with the predetermined reference level, whether the signal is in "mark" state or in "space" state.

A synchronous detection system is based on the reproduction of a carrier frequency by a Costas loop. Therefore, the synchronous detection system, unlike the phase detection system, is free from problems attributed to a frequency variation, thus permitting signal demodulation with high accuracy. However, the synchronous detection system has its own limitations.

In order to obtain a signal whose frequency is equal to the carrier frequency of a signal received, it is necessary to provide a local oscillator, namely, a voltage-controlled oscillator, and a phase locked loop, thus requiring intricate circuitry and a high manufacturing cost. This is a serious problem for radio equipment on vehicles, because it is essential that the radio equipment be small in size, simple in construction and have a low manufacturing cost.

OBJECTS AND SUMMARY OF THE INVENTION

The present invention has been designed in consideration of the foregoing problems. One object of this invention is to provide a modem system in which a PSK-modulated signal, even a high frequency signal, can be demodulated simply and accurately using a delay detection system.

The foregoing object of the invention has been achieved by the provision of a modem system in which a digital pulse signal is transmitted which is phase-modulated in such a manner that a phase reference part having a predetermined period of time in total is provided at the front and/or rear part of a time slot of the digital pulse signal, and the phase of the pulse signal is changed to a predetermined value according to a predetermined monotone function in the first half of the remaining period of time of the time slot, and then changed later in the time slot in the opposite direction to a reference value, with the phase change in the first half of the remaining period time being effected in a first, e.g. increasing, direction in correspondence to a "mark" state of the signal and in a second opposite, e.g. decreasing, direction in correspondence to a "space" state, and the signal thus transmitted is received and divided into two parts and one of the two parts is compared in phase with the other after being delayed, to obtain the original digital pulse signal.

The digital pulse signal may be one which has a phase reference part lasting a half of a time slot and the phase thereof is changed stepwise at the start of the remaining half time slot and restored stepwise at the end thereof, or one which has a phase reference part lasting a quarter of a time slot, and with the remaining time slot being divided into three equal parts, the phase thereof being changed in a direction to a predetermined value at the start of each of the first and second parts of the remaining time slot and changed in the opposite direction to the same value as the predetermined value at the start and at the end of the third part of the remaining time slot.

The monotone function may be a linear function.

Furthermore, the modem system may be such that, on the demodulation side, a signal received is divided into two parts, and one of the two parts is compared in phase with the other after being delayed as long as the total time of the phase reference part, and the signal is converted into an NRZ signal after a DC component is removed therefrom.

Furthermore, because the received signal on the demodulation side is divided into two parts, and one of the two parts is compared in phase with the other after being delayed as long as the total period of time of the phase reference part, the average of the signal obtained through the carrier phase comparison is maintained constant without being affected by the carrier frequency variations, etc., yet the original digital signal can be obtained by conversion to an NRZ signal having a DC component removed therefrom.

BRIEF DESCRIPTION OF THE DRAWINGS

The above and other objects, features and advantages of the invention will be better understood from the following detailed description which is provided in connection with the accompanying drawings.

DETAILED DESCRIPTION OF THE INVENTION

Embodiments of the invention will now be described with reference to the accompanying drawings.

Figure 1A:
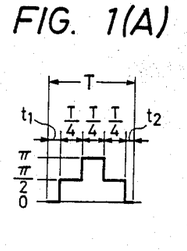
FIGS. 1(A), 1(B), 1(C) amd 1(D) are signal diagrams useful in describing one example of a modulation system of the invention.
Figure 1B:
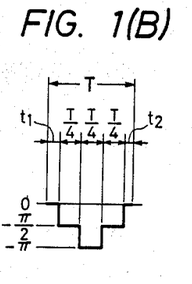
Figure 1C:
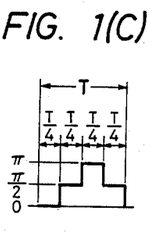
Figure 1D:
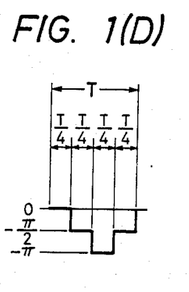

FIGS. 1(A), 1(B), 1(C) and 1(D) show signal diagrams of modulation schemes which may be employed in this invention. Each of respective FIGS. 1(A) . . . 1(B) show time slots T of a transmitted signal. FIGS. 1(A) and 1(B) show the "mark" and "space" conditions of one modulation scheme, while FIGS. 1(C) and 1(D) show the "mark" and "space" conditions of another modulation scheme.

In each of FIGS. 1(A) and 1(B), a reference phase part having a period of time $t_1$ and a reference phase part having a period of time $t_2$ are provided before and after a phase change part, respectively of the transmitted signal. These periods of time $t_1$ and $t_2$ are so determined as to satisfy the relationship $t_1 + t_2 = T/4$ (where T is one time slot of a digital signal). The remaining part of the time slot is divided into three parts each having a period of time $T/4$. For a "mark" condition, as shown in FIG. 1(A), the phase is changed to $\pi/2$ at the start of the first period of time $T/4$, and to $\pi$ at the start of the second period of time $T/4$, and to $\pi/2$, and 0, respectively, at the start and the end of the last period of time $T/4$. For a "space" condition, as opposed to the "mark", the phase is changed to $-\pi/2$, $-\pi$, $-\pi/2$ and O as shown in FIG. 1(B).

FIGS. 1(C) and (D) show the case where $t_1 = T/4$, and $t_2 = O$. The phase change in the remaining part of the time slot is the same as that in the case of FIGS. 1(A) and 1(B).

In this connection, it should be noted that the phase characteristics of FIGS. 1(A) and (B) are equal to those of FIGS. 1(C) and (D). That is, the phase characteristic is maintained unchanged as long as the condition $t_1 + t_2 = T/4$ is satisfied, as described later. For simplification, the signal waveforms shown in FIGS. 1(C) and (D) will be used in the subsequent description. In the following description, the delay time TR is set to $T/4$ consistent with the reference phase part $T/4$ shown in FIGS. 1(C) and 1(D).

Figure 2A:
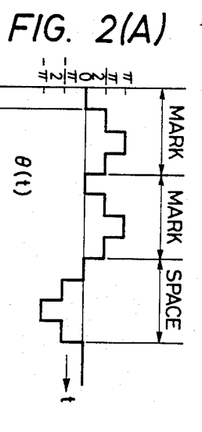
FIGS. 2(A), 2(B), 2(C), 2(D), 2(E), 2(F), 2(G) and 2(H) are signal diagrams useful in describing one example of a demodulation system of the invention.

FIGS. 2(A) . . . 2(E) are signal diagrams useful in describing the delay demodulation of the above-described modulated signal. In the case of FIGS. 2(A) . . . 2(E) a signal of the waveform shown in FIGS. 1(C) and 1(D) is supplied to the demodulator in the order of "mark", "mark" and "space".

Figure 2B:
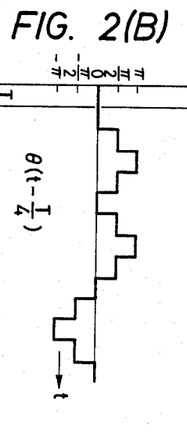

A signal $\theta(t)$ (FIG. 2(A)) which corresponds to "mark", "mark" and "space" is applied to a terminal of a phase comparator, while a signal $\theta(t - T/4)$, which as shown in FIG. 2(B) is delayed by a predetermined time $T/4$ from the signal $\theta(t)$, is supplied to another terminal of the phase comparator.

Figure 2C:
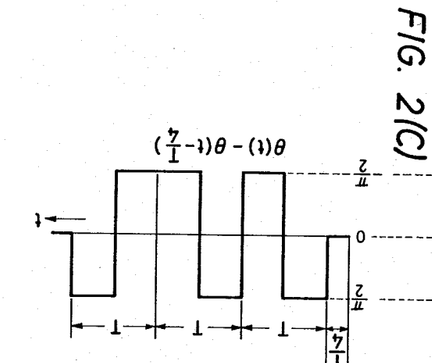
Figure 2D:
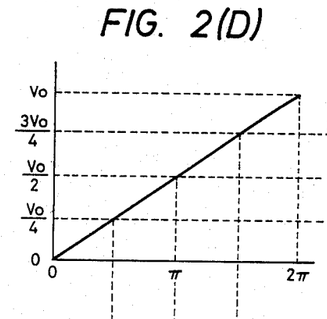
Figure 2E:
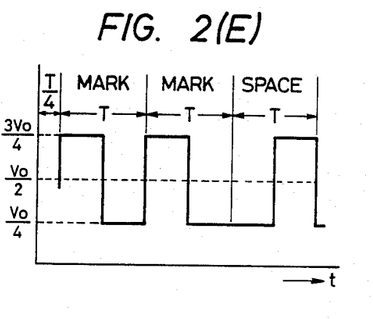

Therefore, the difference $\theta(t) - \theta(t - T/4)$ between the two signals, as shown in FIG. 2(C), is $\pi/2$ in the first half of the time slot corresponding to a "mark" and $-\pi/2$ in the second half, and $-\pi/2$ in the first half of the time slot corresponding to a "space" and $\pi/2$ in the second half. Due to the characteristic of the phase comparator shown in FIG. 2(D), for a "mark" the output level reaches $3V_o/4$ in the first half of the time slot and $V_o/4$ in the second half as shown in FIG. 2(E), and in contrast for a "space" the output level reaches $V_o/4$ in the first half of the time slot and $3V_o/4$ in the second half. Thus, in each of the "mark" and "space" periods, the average of the output level of the phase comparator is $V_o/2$.

Figures 2F, 2G, 2H:
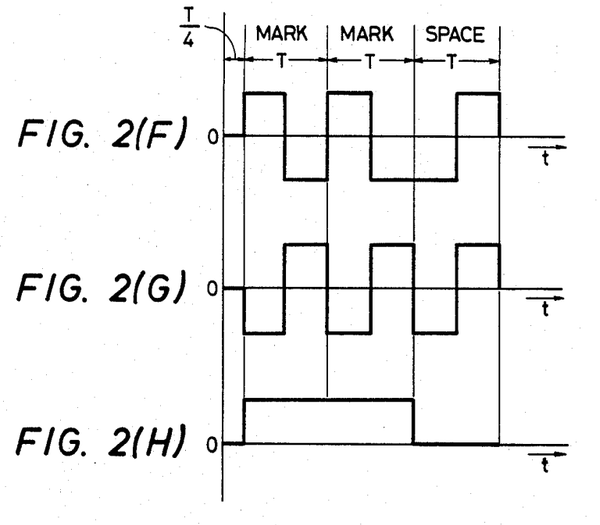

Accordingly, when a DC component is removed from the output signal of FIG. 2(E) the signal waveform of FIG. 2(F) is obtained, then according to the fact that, in a time slot, the signal level changes from positive to negative in the case of "mark" and from negative to positive in the case of "space", an NRZ signal (FIG. 2(H)) can be formed, and the original digital data can be obtained.

The difficulty accompanying the conventional system, namely, variations in the phase comparison reference point, i.e., the reference level for the phase comparator output varies with the carrier frequency with the result that the "mark" and "space" states of the signal cannot be determined, can be eliminated according to the invention as better understood from the following.

The average value of the output signal train of the phase comparator is constant irrespective of the form of the output signal train (or the arrangement of signals such as "mark"-"mark"-"mark", "mark"-"space"-"mark"). Therefore, if the DC component is eliminated from the output waveform by using a capacitor, etc., then irrespective of the shift of the reference point a stable waveform can be obtained which is equal in amplitude in both positive and negative directions as shown in FIG. 2(F). Thus, the determination of the "mark" and "space" states can be achieved without being affected by variations of the reference level.

Figure 3:
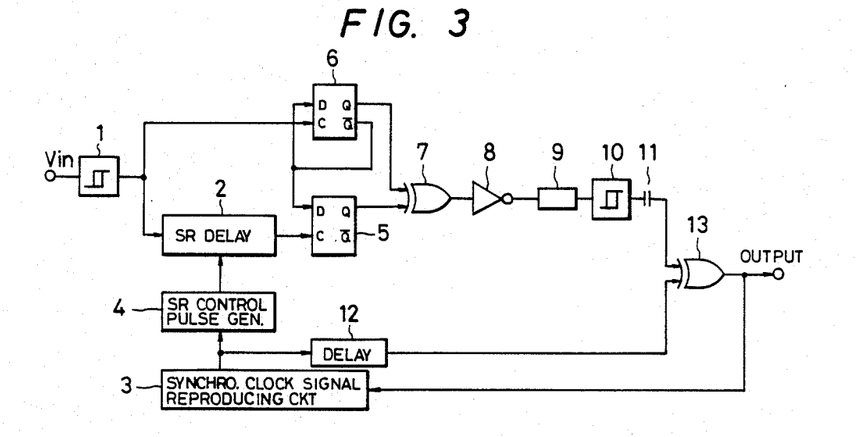
FIG. 3 is an electrical circuit showing one example of a demodulation circuit used in the invention.

FIG. 3 is an electrical circuit of one example of a demodulation circuit which may be used to carry out the invention. In the circuit, an input signal Vin is suplied to a Schmitt trigger circuit 1, the output of which is applied to an SR (shift register) delay circuit 2 and to a D-type flip-flop 6. An SR (shift register) control pulse generating circuit 4 is controlled by a synchronizing clock signal supplied by a synchronizing clock signal reproducing circuit 5 which receives a demodulated NRZ signal from the output of an EXLUSIVE OR (XOR) gate B. The SR delay circuit 2, to which the output signal of the Schmitt trigger circuit 1 is applied, receives the output pulse signal of the SR control pulse generating circuit 4, to set a delay time.

The output signal of the SR delay circuit 2, and the output signal of the Schmitt trigger circuit 1 are applied to the clock input terminals C of D-type flip-flops 5 and 6, respectively, and the $\overline{Q}$ output signal of the flip-flop 6 is applied to the D input terminals of the flip-flops 5 and 6. The Q output signals of the flip-flops 5 and 6 are applied to an EXCLUSIVE OR (XOR) gate 7 for phase comparison.

The output signal of the XOR gate 7 is supplied through an inverter 8, a low-pass filter 9 and a Schmitt trigger circuit 10 to a capacitor so that a DC component is removed therefrom; that is, the signal as shown in FIG. 2(F) is obtained. The signal thus obtained, and a signal obtained by delaying by a predetermined period of time the synchronizing clock signal supplied by the synchronizing clock signal reproducing circuit 3 in delay circuit 12 are applied to XOR gate 13, so that the NRZ signal as shown in FIG. 2(H) is obtained.

As is apparent from the above description, the FIG. 3 demodulation circuit is advantageous in that it is obtained merely by adding the capacitor 11, the XOR gate 13 and the delay circuit 12 to a conventional delay detection circuit; that is, it the circuitry is simple, and it can accurately demodulate the signal without being affected by variations of the carrier frequency.

The delay time is set to T/4 in the demodulation circuit, as was described above. Therefore, the variation of the operating reference point of the phase comparator can be reduced to $\Delta\theta$ T4 (where $\Delta\theta$ is the variation of a carrier frequency), with the result that stability is much improved.

Furthermore, as the reference phase part is provided before and/or after the phase change part, interference between the signals in the time slots can be prevented during demodulation.

In the above-described embodiment, the phase is changed to $\pi$; however, even if the circuit is so modified that the phase is changed to an optional phase $\theta$, the circuit can operate in the same manner.

Figure 4A:
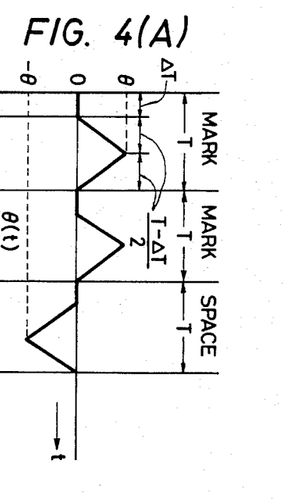
FIGS. 4(A), 4(B), 4(C), 4(D) and 4(E) and 5(A), (5(B), 5(C), 5(D) and 5(E) are signal diagrams useful in describing other examples of a demodulation system.

FIGS. 4(A) ... 4(E) are signal diagrams useful in explaining another embodiment. The embodiment is different from the above-described embodiment only in that, as shown in FIG. 4(A), the first half of a phase change part corresponding to a "mark" period changes linearly to $\theta$ and the second half changes in the opposite direction, while the first half of a phase change part corresponding to a "space" period changes linearly to $-\theta$ and the second half changes in the opposite direction, and that a reference phase part lasts for a given period of time $\Delta T$.

Figures 4B, 4C:
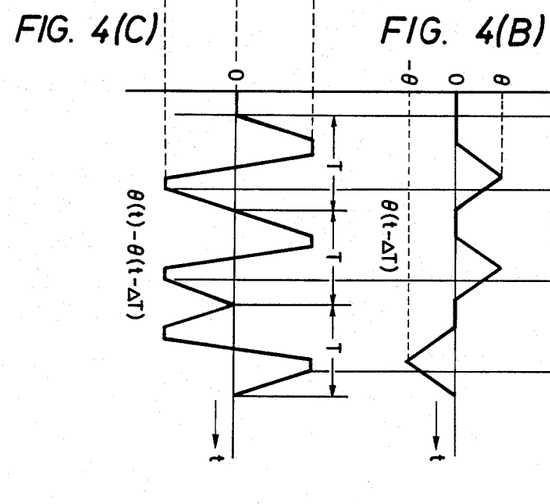

Therefore, if the signal shown in FIG. 4(A) is represented by $\theta$ (t), then the delayed signal $\theta$ (t$-\Delta$T) is as shown in FIG. 4(B). The difference signal $\theta$ (t)$-\theta$ (t$-\Delta$T) between the two signals has a waveform which, as shown in FIG. 4(C), has extremely steep rising and falling components.

Figure 4D:
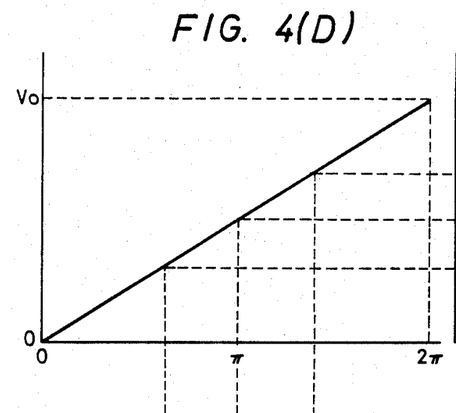
Figure 4E:
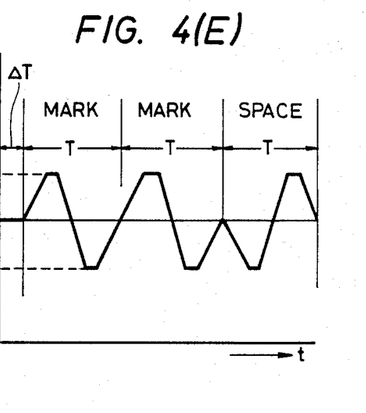

The difference signal shown in FIG. 4(C) is supplied to a phase comparator having a characteristic as shown in FIG. 4(D), so that an output waveform as shown in FIG. 4(E) is obtained. That is, if, in the demodulation circuit of FIG. 3, the delay time by the SR delay circuit 2 is set to $\Delta T$, then the NRZ signal corresponding to the original digital data can be obtained.

In the above-described embodiment, increasing the time $\Delta T$ results in an increase in amplitude of the output signal of the phase comparator, so that the "mark" and "space" determination can be achieved with higher accuracy, whereas decreasing the time $\Delta T$ decreases the shift $\Delta\Omega\Delta T$ of the phase reference point due to the carrier frequency variation, so that stability is improved. Accordingly, time $\Delta T$ is set to a value which, depending on the system employed, best meets these contradictory characteristics.

In the above-described embodiment, the phase changes linearly; however, the circuit may be so modified that the phase changes according to a different monotone function instead of a linear function, but operation is the same as the above-described embodiment.

Figure 5A:
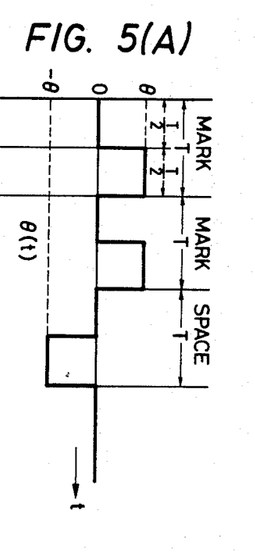

FIGS. 5(A) ... 5(E) are signal diagrams for a description of another embodiment. This embodiment is different from the above-described embodiments in that, as shown in FIG. 5(A), in a phase change part corresponding to a "mark" period, the phase changes to $\theta$ ($\theta\neq\pi$) at the start and to 0 at the end, whereas in a phase change part corresponding to a "space" period, the phase changes to $-\theta$ at the start and 0 at the end, and in that a phase reference part lasts for a period of time T/2.

Figure 5B:
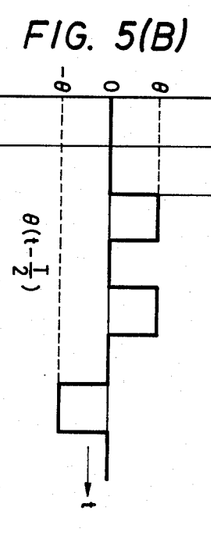

Accordingly, if the signal of FIG. 5(A) is represented by $\theta$ (t), then a delayed signal $\theta$ (t$-$T/2) is as shown in FIG. 5(B). The difference signal between the two signals is as indicated in FIG. 5(C); that is, the waveform of the difference signal is such that the phase changes to $\theta$ in the first half of a "mark" period and to $-\theta$ in the second half, and it changes to $-\theta$ in the first half of a "space" period and to $\theta$ in the second half.

Figure 5C:
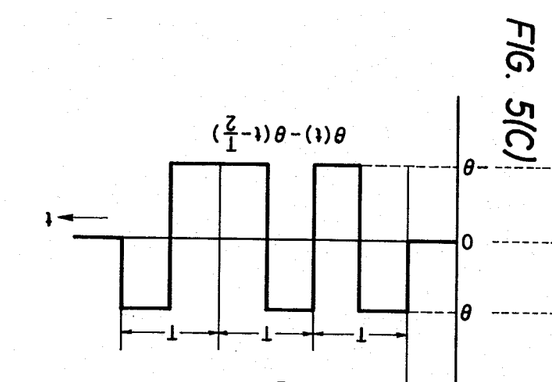
Figure 5D:
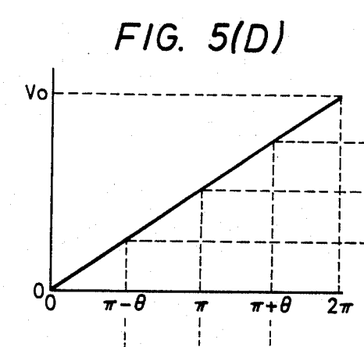
Figure 5E:
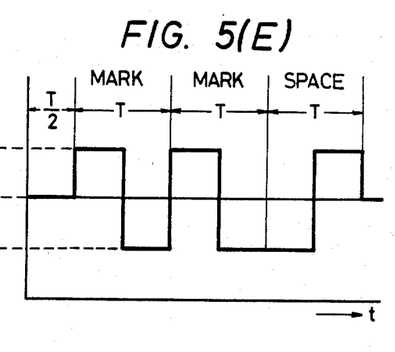

The difference signal of FIG. 5(C) is applied to a phase comparator having a characteristic as shown in FIG. 5(D). as a result of which an output waveform as shown in FIG. 5(E) is obtained. Thus, if in the demodulation circuit of FIG. 3, the delay time of the SR delay circuit 2 is set to T/2, then an NRZ signal corresponding to the original digital data can be obtained.

Figure 6:
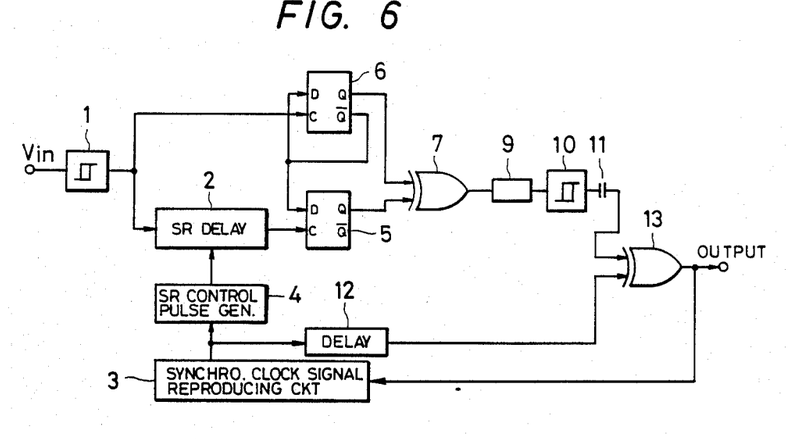
FIG. 6 is an electrical circuit showing another example of a demodulation circuit used in the invention.

FIG. 6 is an electrical circuit showing another example of the demodulation circuit. The demodulation circuit of FIG. 6 is different from that of FIG. 3 only in that the inverter 8 is eliminated, and the delay time of the delay circuit 12 is changed by a half period of the synchronizing clock signal from that of the demodulation circuit of FIG. 3.

Figure 7A:
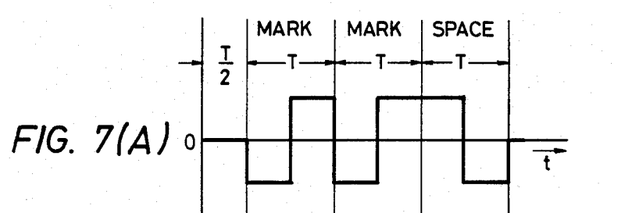
FIGS. 7(A), 7(B) and 7(C) are signal diagrams useful in explaining the operation of the demodulation circuit of FIG. 6.
Figure 7B:
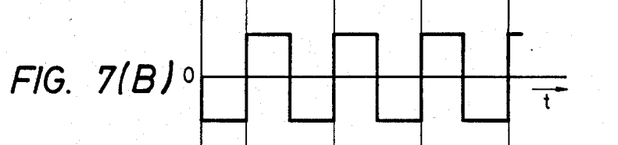
Figure 7C:
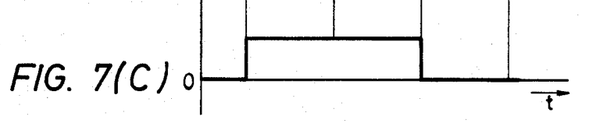

Accordingly, in the demodulation circuit of FIG. 6, the output signal of the phase comparator is opposite in level to that of the phase comparator in the demodulation circuit of FIG. 3 (see FIG. 7(A)), and the synchronizing clock signal supplied by the delay circuit 12 is also opposite in level to that supplied by the delay circuit 12 in the demodulation circuit of FIG. 3 (FIG. 7(B)). Therefore, when the two signals are applied to the XOR gate 13, the demodulation circuit provides the same NRZ signal (FIG. 7(C)) as the demodulation cirucit of FIG. 3.

As described above, the modem system of the invention provides a transmission signal which is PSK-modulated in such a manner that a phase reference part of a predetermined time is provided in the front and/or rear part of a time slot of a digital pulse signal, and the phase is changed from a reference value to a first or second predetermined value for a "mark" or "space" respectively according to a monotone function in the first half of the remaining period of time of the time slot and changed in the opposite direction to the reference value in the second half of the remaining period. Therefore, the modem system of the invention can obtain the original digital signal readily and accurately by means of a delay detection system, in which the signal is delayed as long as the time of the phase reference part, without being affected by any variations in the carrier frequency.

Figure 13:
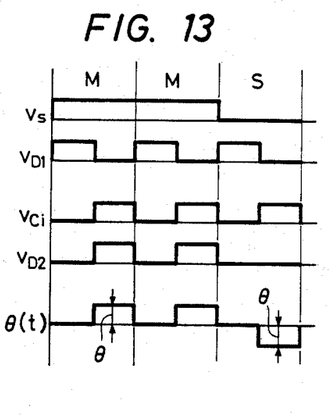
FIG. 13 is a signal diagram useful in explaining operation of the FIG. 12 circuit.
Figure 14:
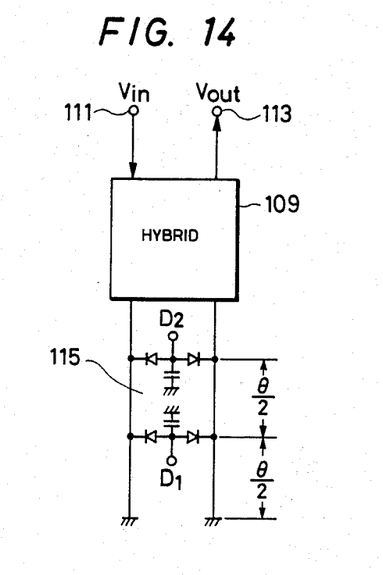
FIG. 14 is a phase shift circuit used in conjunction with the FIG. 12 modulation circuit.

Thus far, description has been made of the modulation signals and the de-modulation circuit for demodulating those signals. The modulation circuits themselves, are simple and straightforward. A suitable modulation system for generating the modulated signals shown in FIG. 5A in the application is shown in FIGS. 12, 13 and 14.

Figure 12:
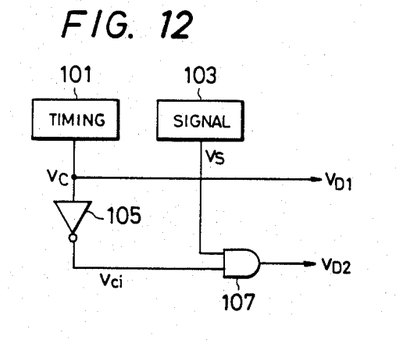
FIG. 12 is a circuit diagram of a modulation circuit which may be used in the invention.

FIG. 12 illustrates a modulation circuit in which a clocking signal source 101 and a data signal source 103 are provided. These sources respectively produce timing pulses $V_c$ and data pulses $V_s$. The timing pulse $V_c$ is supplied as an output switching signal $V_{D1}$ and is also applied to inverter 105 to produce a signal $V_{ci}$ which is applied as one input to an AND gate 107. The other input to AND gate is the data signal $V_s$. The output of the AND gate 107 is a second switching signal $V_{D2}$. The relationship of the switching signals produced by the modulation circuit shown in FIG. 12 is illustrated in FIG. 13. As shown therein, the data signal produces a "mark"- "mark"- "space"-signal pattern. The corresponding switching signals $V_{D1}$ and $V_{D2}$ generated by the modulation circuit of FIG. 12 is also illustrated. The switching signals are applied to a hybrid circuit 109 illustrated in FIG. 14. A carrier is applied to the input terminal 111 and the output of the hybrid circuit it taken at terminal 113. The phase of the signal applied to the input terminal $V_{in}$ is changed in accordance with the switching signals $V_{D1}$ and $V_{D2}$ which are applied to a diode network 115. As shown in FIG. 13, when both switching signals $V_{D1}$ and $V_{D2}$ are in a low state, the diode network 115 causes the hybrid circuit 109 to produce a negative phase shift for the signal applied at the terminal $V_{in}$ to the hybrid circuit 109. When $V_{D1}$ is high and $V_{D2}$ is low, a reference phase part is established meaning that no phase shift occurs in hybrid circuit 109. When $V_{D2}$ is high and $V_{D1}$ is low, a positive phase shift is generated. As shown in the signal diagram (t) of FIG. 13 the resultant output from the hybrid circuit is a phase shift in a positive direction for a "mark" signal and a phase shift in a negative direction for a "space" signal.

The modulation signal patterns disclosed in FIGS. 2(A) and 4(A) can be produced using known orthogonal phase modulation circuits and function signal pattern generating circuit, as disclosed for example, in the following publications:

(A) IEEE Transactions On Vehicular Technology, Vol. VT-30, No. 3, August, 1981, "A Compact Spectrum Constant Envelope Digital Phase Modulation";

(B) IEEE Transactions On Communications, Vol. COM-31, No. 5, May, 1983, "A New Cross-Correlated Phase-Shift Keying Modulation Technique";

(C) IEEE Transactions On Vehicular Technology, Vol. VT-33 No. 3, August, 1983, "Digital Portable Transceiver Using GMSK Modem and ADM Technique";

(D) IEEE Transactions On Communication Technology, Vol. COM-16, No. 1, February, 1968 "Generation of Digital Signaling Waveforms";

(E) IEEE Transactions On Communications, Vol. COM-25, No. 10, October, 1977, "A Digital Filter-Modulation Combination For Data Transmission."

While preferred embodiments of the invention have been described and illustrated, it is apparent that many modifications can be made without departing from the scope or spirit of the invention. Accordingly, the invention is not limited by the foregoing description, but is only limited by the scope of the claimed appended hereto.

I claim:

1. A modem system for digital data comprising:
means for producing a transmission signal which is phase-modulated in accordance with "mark" and "space" states of an applied digital signal in repetitive signal time slots each of predetermined duration, said transmission signal having a phase reference period of predetermined duration provided at least one of the front and rear portions of each of said slots during which said transmission signal assumes a reference phase value, and a phase change period provided in the remaining portion of each time slot, the phase of said transmission signal for a "mark" state changing in a first direction from a reference phase value to a first predetermined phase value according to a first predetermined function in a first half of said remaining portion and then changing during a second half of said remaining portion from said first predetermined phase value to said reference phase value, and the phase of said transmission signal for a "space" state changing in a second direction, opposite to said first direction, from said reference phase value to a second predetermined phase value according to a second predetermined function in said first half of said remaining portion and then changing during a second half of said remaining portion from said second predetermined phase value to said reference phase;
means for applying said digital signal to said producing means; and,
means for demodulating said transmission signal to reproduce said digital signal, said demodulating means comprising:
means for dividing said transmission signal into two signals,
means for delaying one of said two signals relative to the other to produce a pair of relatively delayed signals, and
means for comparing said pair of relatively delayed signals to produce a signal representative of said digital signal.

2. A modem system as in claim 1, wherein said phase reference portion lasts for a duration of one-half of the time period of each of said time slots and the phase of said transmission signal changes stepwise from said reference value at the start of said remaining period of each time slot and returns stepwise to said reference value at the end of said remaining period.

3. A modem system as in claim 1, wherein said phase reference portion lasts for a duration of one quarter of the time period of each of said time slots and said remaining portion is divided into three equal parts, the phase of said transmission signal being changed in one direction at the start of each of said first and second parts and being changed in another opposite direction at the beginning and end of said third part.

4. A modem system as in claim 1, wherein said first and second predetermined functions are monotone functions.

5. A modem system as in claim 1, wherein each monotone function is a linear function.

6. A modem system as in claim 1, wherein each monotone function is a step function.

7. A modem system as in claim 1, wherein the relative delay between said two signals is for as long as the total time period of said phase reference period.

8. A modem as in claim 1, wherein said demodulating means further comprises means receiving the output of said comparing means for converting said output into an NRZ digital signal.

* * * * *